United States Patent [19]

McIntosh

[11] 3,902,836
[45] Sept. 2, 1975

[54] HOLLOW RIGID CORE USED IN THE CASTING OR INJECTION MOLDING OF A PNEUMATIC TIRE

[75] Inventor: Kenneth W. McIntosh, Cuyahoga Falls, Ohio

[73] Assignee: The Goodyear Tire & Rubber Company, Akron, Ohio

[22] Filed: Oct. 11, 1974

[21] Appl. No.: 514,163

[52] U.S. Cl. ............... 425/242; 425/55; 425/56; 425/35; 249/185
[51] Int. Cl.² B29H 5/18; B29H 5/02; B29H 17/00; B29C 5/00
[58] Field of Search ............ 425/32, 43, 51, 52, 54, 425/55, 35, 49, 56; 249/184, 185

[56] References Cited
UNITED STATES PATENTS

| | | | |
|---|---|---|---|
| 942,922 | 12/1909 | O'Connor | 249/185 X |
| 1,316,275 | 9/1919 | Clark et al. | 425/55 |
| 1,366,290 | 1/1921 | Smith et al. | 425/51 |
| 1,657,835 | 1/1928 | Mather | 425/51 |
| 1,879,738 | 9/1932 | Dickerson | 249/185 |
| 2,476,884 | 7/1949 | Maynard | 425/52 X |
| 2,763,317 | 9/1956 | Ostling et al. | 425/52 X |
| 3,123,122 | 3/1964 | Beckadolph | 18/42 T X |
| 3,457,594 | 7/1969 | Baudou | 425/35 |
| 3,459,849 | 8/1969 | DeRonde | 425/32 X |
| 3,645,655 | 2/1972 | Beneze | 425/35 |

*Primary Examiner*—J. Howard Flint, Jr.
*Attorney, Agent, or Firm*—F. W. Brunner; H. E. Hummer

[57] ABSTRACT

A mold used in the casting, or injection molding of a pneumatic tire. The mold comprises several rigid sections having configured inner peripheral surfaces for molding the outside of the tire. A hollow, rigid core, composed of a number of arcuate segments, is disposed in spaced relation from the rigid, inner peripheral surfaces of the mold to form the inner peripheral surface of the tire. An elastic bladder is inflatable within the hollow rigid core to help support the core and seal the joints between abutting edges of adjacent arcuate segments to prevent leakage of the fluid, used in forming the tire, from the mold cavity between the core and sections of the mold.

6 Claims, 3 Drawing Figures

PATENTED SEP 2 1975    3,902,836

HOLLOW RIGID CORE USED IN THE CASTING OR INJECTION MOLDING OF A PNEUMATIC TIRE

BACKGROUND OF THE INVENTION

The invention is particularly useful in the centrifugal casting, or injection molding of pneumatic tires, and is directed to a highly improved core used in forming the inner peripheral surfaces of the tire during these processes.

British Patent No. 1,139,643 shows and describes both types of cores generally used in centrifugally casting a tire; namely, solid and inflatable cores. The solid rigid core, although made in sections, is extremely difficult to remove from within a cast or molded tire. The inflatable core, on the other hand, is highly flexible and resilient, making it difficult controlling the shape of the core and consequent gauge of rubbery material around the tire.

U.S. Pat. No. 3,751,551 describes the problems of using both types of cores, and proposes a third alternative of using an inflatable core which is stabilized, or made firm, by filling the core with liquid under a pressure sufficient to counteract the molding pressure. It can be appreciated that the size of such inflatable bladder-type cores must be severely restricted to precisely control the gauge of rubbery material in the finished tire. It is extremely difficult building such an elastic bladder. The invention is directed to an improved core which will eliminate, or substantially reduce the problem of removing the core from a cast, or molded tire, while providing an accurately shaped, rigid core for producing more nearly uniform tires.

Briefly stated, the invention is in an apparatus used in the casting or injection molding of a tire. The apparatus comprises a rigid mold having inner peripheral surfaces for forming the outer surfaces of the tire, and an annular core in spaced relation for the inner surfaces of the mold for forming the inner peripheral surfaces of the tire. The core is a hollow, annular, rigid shell composed of a number of arcuate segments which are held together in abutting relation during the formation of the tire. The segments are collapsible for easy removal from within the cast or molded tire.

DESCRIPTION OF THE DRAWING

The following description of the invention will be better understood by having reference to the annexed drawing, wherein.

ENVIRONMENT OF THE INVENTION

Figure 1:
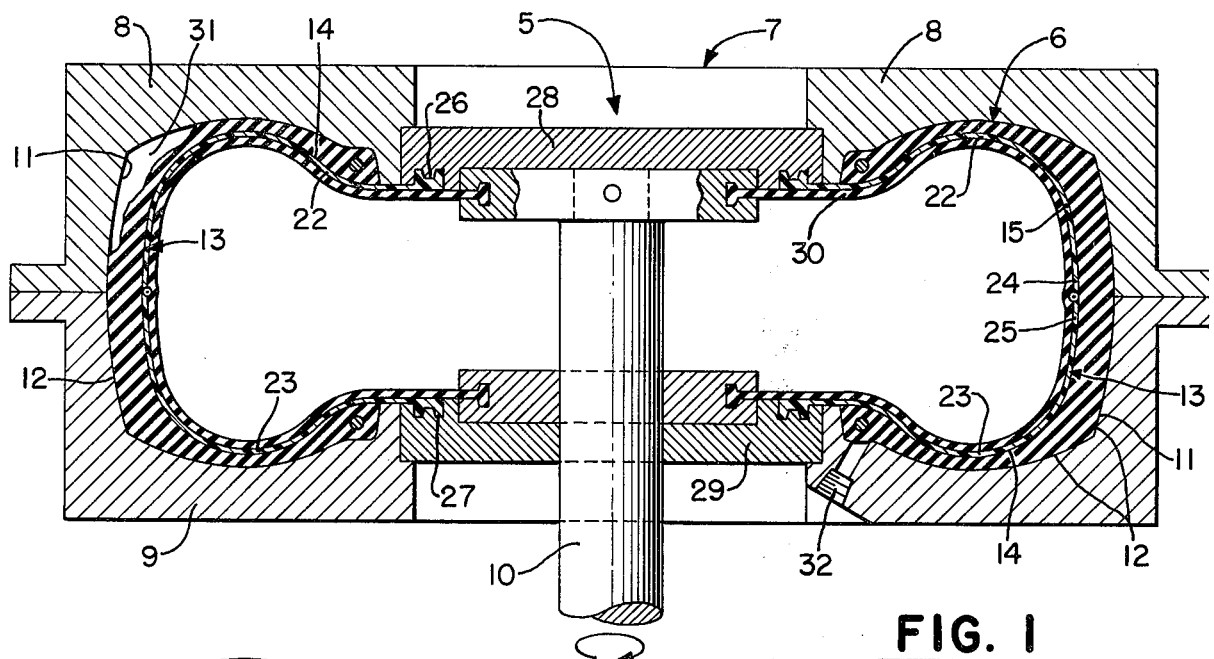
FIG. 1 is a section of a mold and tire, and a core made in accordance with the invention.

Referring to FIG. 1, there is shown an apparatus 5 used in the centrifugal casting of a pneumatic tire 6. The apparatus 5 essentially comprises a mold 7 composed of two rigid sections 8 and 9 which are secured together by any suitable fastening means. The mold 7 is secured to a drive shaft 10 which is rotated by any conventional mechanism used in rotating the mold 7 during the centrifugal casting of a tire. The mold 7 has a rigid, toroidally shaped inner peripheral surface 11 which is specially configured to form the outer peripheral surface 12 of the tire 6. A toroidally shaped, rigid core 13 is secured to the mold 7 in spaced radial relation from the rigid, inner surface 11 of the mold 7, for forming the inner peripheral surface 14 of the tire 6.

THE INVENTION

Figure 3:
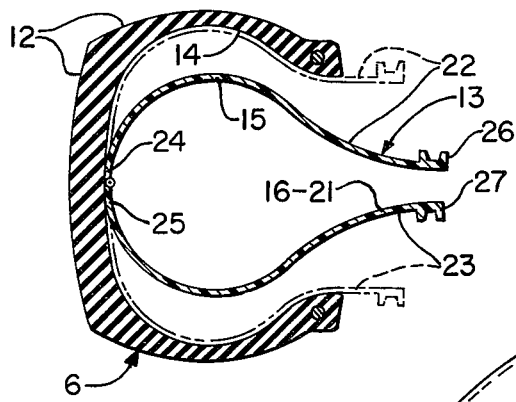
FIG. 3 is a section of the tire and core showing the core, in dotted line, fully expanded and, in full line, collapsed for removal from within the tire.
Figure 2:
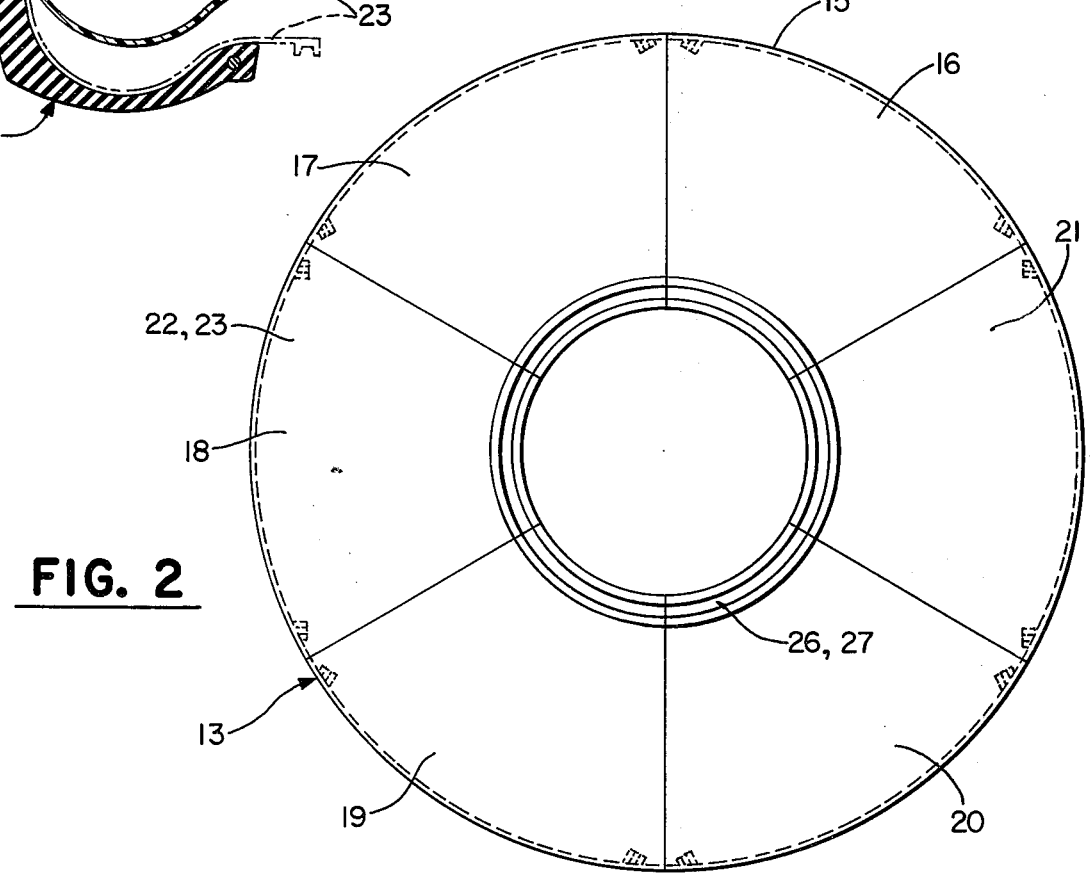
FIG. 2 is a side view of the core illustrating the arcuate segments forming the core.

The rigid, annular core 13, as best seen in FIGS. 2 and 3, is a hollow, annular, rigid shell 15 composed of a number of similarly dimensioned, arcuate segments 16–21, each of which is composed of two like parts 22 and 23 which are hinged together along their longer, arcuate marginal edges 24 and 25, such that their shorter arcuate edges 26 and 27 can be pivoted towards each other to collapse the segments 16–21 for removal from within the tire 6.

The shorter arcuate edges, or free ends 26 and 27 of each of the arcuate segments 16–21 are designed for innerlocking engagement with a pair of spaced locking rings 28 and 29 which are removably mounted on the sections 8 and 9 of the mold 7. Thus, the individual segments 16–21 of the core 13 are held in abutting annular relation. Any one of the segments 16–21 can be readily removed from the core 13 when the locking rings 28 and 29 are removed from the mold sections 8 and 9.

An elastic bladder 30, secured within the mold 7, is inflatable within the hollow rigid shell 15. The bladder 30 is composed of any suitable elastomeric material, e.g. rubber. The bladder 30, upon inflation, compressively engages the hollow shell 15 to provide additional support for the hollow rigid core 13 and seal the joints between the abutting arcuate segments 16–21 of the hollow shell 15, such that the fluid used in forming the tire 6 will not leak out of the molding cavity or space 31 between the rigid core 13 and the inner peripheral surface 11 of the mold 7. The mold cavity 31 is provided with any suitable sprue 32 through which the casting fluid enters the mold cavity 31. The hollow, toroidally shaped rigid core 13 is composed of any suitable material, e.g. metal, or any appropriate plastic which is sufficiently strong, or reinforced to withstand the high pressures exerted against the core 13 during the centrifugal casting, or injection molding processes.

Thus, there has been provided a highly improved rigid core useful in either the casting or injection molding of a pneumatic tire. The arcuate segments of the hollow shell are identical in design and shape, thus providing a core which is more economically manufactured. Moreover, the hinged design of the hollow shell segments permits their easy removal by rotating the parts of the shell segments to their collapsed position as shown in FIG. 3. The collapsed segments are successively removed from within the tire, after which the tire is taken from the mold. This is not the case where a solid core is used, since one of the segments must be specially designed as a keystone for easy removal from between adjacent core sections which are not collapsible like the hollow shell segments of the applicant's invention.

What is claimed is:

1. An apparatus used in the casting or injection molding of a tire, comprising:
   a. a mold having a rigid, annular surface for forming the outer peripheral surface of the tire;
   b. an annular core disposed within the rigid, annular surface of the mold and radially spaced therefrom for forming the inner peripheral surface of the tire, the core including:

I. a collapsible hollow, rigid shell comprising a plurality of arcuate segments in annular abutting relation, the shell capable of withstanding fluid pressure exerted on the shell during the formation of the tire within the mold; and II. means for maintaining the arcuate segments in annular abutting relation during the formation of a tire in the mold; and c. an elastic bladder secured within the mold and inflatable within the hollow shell to help support the shell and seal any joints between adjacent, abutting arcurate segments of the shell.

2. The apparatus of claim 1, which includes:

III. means for collapsing each of the arcuate segments for removal from within a cast or molded tire.

3. The apparatus of claim 2, wherein each of the arcuate segments includes a pair of oppositely shaped parts, and the means (III) for collapsing each of the arcuate segments includes means for hinging each pair of parts together along their longer arcuate marginal edges such that opposing free ends thereof are rotatable towards each other whereby the segments collapse.

4. The apparatus of claim 3, wherein the means (II) for maintaining the segments in annular abutting relation include means at the free ends of each pair of parts for interlocking the segments in annularly aligned relation within the mold.

5. The apparatus of claim 4, which includes means for rotating the mold.

6. The apparatus of claim 4, which includes means for allowing the flow of fluid into the space between the core and adjacent inner peripheral surface of the mold.

* * * * *